United States Patent
Zhou et al.

(10) Patent No.: US 11,689,690 B2
(45) Date of Patent: Jun. 27, 2023

(54) METHOD AND DEVICE FOR AUDIO AND VIDEO SYNCHRONIZATION

(71) Applicants: BEIJING XIAOMI MOBILE SOFTWARE CO., LTD., Beijing (CN); BEIJING XIAOMI PINECONE ELECTRONICS CO., LTD., Beijing (CN)

(72) Inventors: Lingsong Zhou, Beijing (CN); Xiaoming Li, Beijing (CN)

(73) Assignees: BEIJING XIAOMI MOBILE SOFTWARE CO., LTD., Beijing (CN); BEIJING XIAOMI PINECONE ELECTRONICS CO., LTD., Beijing (CN)

( * ) Notice: Subject to any disclaimer, the term of this patent is extended or adjusted under 35 U.S.C. 154(b) by 147 days.

(21) Appl. No.: 17/480,902

(22) Filed: Sep. 21, 2021

(65) Prior Publication Data

US 2022/0311967 A1   Sep. 29, 2022

(30) Foreign Application Priority Data

Mar. 26, 2021   (CN) .......................... 202110331398.7

(51) Int. Cl.
*H04N 5/04*   (2006.01)
*H04N 7/52*   (2011.01)
(Continued)

(52) U.S. Cl.
CPC .............. *H04N 5/602* (2013.01); *H04N 5/04* (2013.01); *H04N 7/52* (2013.01); *H04N 17/004* (2013.01); *H04N 2017/006* (2013.01)

(58) Field of Classification Search
CPC ............ H04N 5/602; H04N 5/04; H04N 7/52; H04N 17/004; H04N 2017/006
See application file for complete search history.

(56) References Cited

U.S. PATENT DOCUMENTS

| | | | |
|---|---|---|---|
| 10,080,061 B1 * | 9/2018 | Kirley | H04N 21/4852 |
| 10,613,817 B2 * | 4/2020 | Millington | H04L 65/65 |
| 2012/0082424 A1 * | 4/2012 | Hubner | H04N 21/242 |
| | | | 386/E5.032 |

FOREIGN PATENT DOCUMENTS

EP   2955713 A1   12/2015

OTHER PUBLICATIONS

European Patent Application No. 21199763.0, Search and Opinion dated Apr. 4, 2022, 7 pages.

* cited by examiner

*Primary Examiner* — Thai Q Tran
*Assistant Examiner* — Jose M Mesa
(74) *Attorney, Agent, or Firm* — Cozen O'Connor

(57) ABSTRACT

A method for audio and video synchronization, includes: receiving audio data sent by the video player, wherein the audio data includes more than one audio sampling points; obtaining a network delay change between the audio player and the video player, wherein the network delay change refers to a time difference between the network delay monitored for the first time and the network delay monitored for the last time; determining a total amount of audio data to be adjusted according to the network delay change; and adding audio sampling points to the received audio data or deleting audio sampling points from the received audio data according to the total amount of audio data to be adjusted and a preset adjustment strategy, so that the audio player is synchronized with the video player, and playing the added or deleted audio data.

20 Claims, 6 Drawing Sheets

(51) Int. Cl.
*H04N 5/60* (2006.01)
*H04N 17/00* (2006.01)

METHOD AND DEVICE FOR AUDIO AND VIDEO SYNCHRONIZATION

CROSS REFERENCE TO RELATED APPLICATIONS

This application claims priority to Chinese Patent Application No. 202110331398.7, filed on Mar. 26, 2021, the content of which is incorporated herein by reference in its entirety.

TECHNICAL FIELD

The present disclosure relates to intelligent Internet of Things, and particularly to a method and an apparatus for audio and video synchronization.

BACKGROUND

With the development of artificial intelligence Internet of Things (AIoT), interconnected and synchronized music playback across devices has been launched on multiple products. For example, the combined stereo function has been launched on multiple platforms such as a XiaoAI speaker and an Amazon Echo®. The combination of TVs and speakers may provide users with good viewing experiences.

SUMMARY

According to a first aspect of the embodiments of the disclosure, a method for audio and video synchronization provided. The method is applied to an audio player connected to a video player via a network. The method includes: receiving audio data sent by the video player, in which the audio data includes more than one audio sampling points; obtaining a network delay change between the audio player and the video player, in which the network delay change refers to a time difference between network delay monitored for the first time and network delay monitored for the last time; determining a total amount of audio data to be adjusted according to the network delay change; and adding audio sampling points to the received audio data or deleting audio sampling points from the received audio data according to the total amount of audio data to be adjusted and a preset adjustment strategy, so that the audio player is synchronized with the video player, and playing the added or deleted audio data.

According to a second aspect of the embodiments of the disclosure, a computer device includes a processor and a memory configured to store instructions executable by the processor. The processor is configured to: receive audio data sent by a video player, in which the audio data includes more than one audio sampling points; obtain a network delay change between an audio player and the video player, in which the network delay change refers to a time difference between network delay monitored for the first time and network delay monitored for the last time; determine a total amount of audio data to be adjusted according to the network delay change; add audio sampling points to the received audio data or delete audio sampling points from the received audio data according to the total amount of audio data to be adjusted and a preset adjustment strategy, so that the audio player is synchronized with the video player, and play the added or deleted audio data.

According to a third aspect of the embodiments of the disclosure, a non-transitory computer-readable storage medium is provided. When instructions in the storage medium are executed by a processor of a mobile terminal, the mobile terminal is caused to execute the method for audio and video synchronization. The method includes: receiving audio data sent by a video player, in which the audio data includes more than one audio sampling points; obtaining a network delay change between an audio player and the video player, in which the network delay change refers to a time difference between network delay monitored for the first time and network delay monitored for the last time; determining a total amount of audio data to be adjusted according to the network delay change; and adding audio sampling points to the received audio data or deleting audio sampling points from the received audio data for further playing according to the total amount of audio data to be adjusted and a preset adjustment strategy, so that the audio player is synchronized with the video player, and playing the added or deleted audio data.

It should be noted that, the details above and in the following are exemplary and explanatory, and do not constitute limitations to the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present disclosure. Rather, they are merely examples of the apparatuses and methods consistent with some aspects of the present disclosure as recited in the appended claims.

A TV may be connected to the speakers via WiFi to form a surround sound playback system. When playing videos, the corresponding sounds need to be played by both the TV and the speakers while the TV is playing images and pictures. However, since the audio data played by the speakers needs to be transmitted from the TV via a network such as WiFi to the speakers, a transmission delay causes the sounds played by the speakers to be out of synchronization with the images and pictures played on the TV screen, which affects user experiences.

Figure 1:
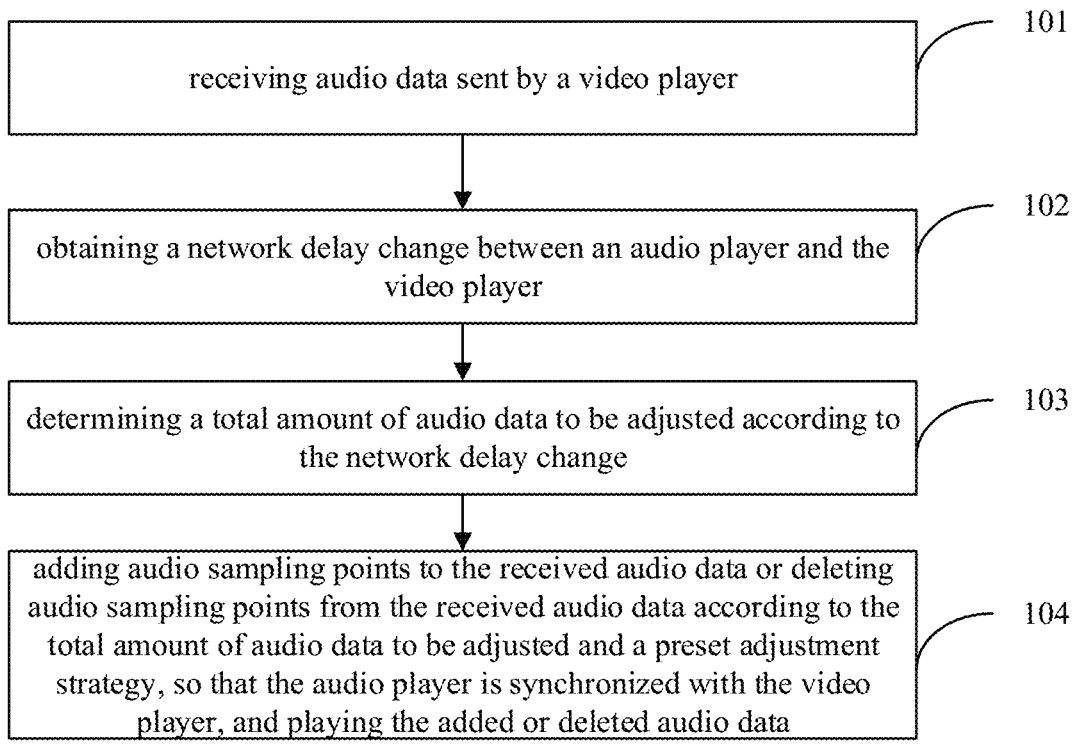
FIG. 1 is a flowchart illustrating a method for audio and video synchronization according to an example embodiment.

In order to solve the above-mentioned problem, an example embodiment of the present disclosure provides a method for audio and video synchronization. By the method, the influence of network transmission delay is eliminated. The process of achieving audio and video synchronization is shown in FIG. 1.

At 101, audio data sent by a video source device is received.

In the present disclosure, an audio playback device is connected to the video source device through a network. The audio playback device receives audio data sent by the video source device. The audio playback device may perform data interaction with the video source device through wired or wireless communication. The wireless communication method may be WiFi, Bluetooth, etc.

The video source device may be a video player, i.e., a terminal that has network communication capabilities and is able to play video data, such as a TV, a mobile phone, a tablet computer, or a notebook computer. Those skilled in the art should know that the video source device involved in the present disclosure is not limited to the scope listed above.

The audio playback device may be an audio player, such as, a speaker or other electronic devices with a sound playback module.

The audio data includes more than one audio sampling points.

The audio data sent by the video source device is sent in packets. Each packet includes at least one audio frame and division time corresponding to the at least one audio frame. Each audio frame includes a predetermined number of audio sampling points. The division time refers to the time when the action of dividing the audio data into the audio frame occurs. That is, the received audio data may be divided into multiple audio frames at each division time of each audio frame. After each audio frame is received, time for playing each audio frame is determined according to the division time of each audio frame, preset time appointed with the video source device, and first network delay time.

At 102, a network delay change is obtained between the audio playback device and the video source device.

In the step, the network delay change refers to a time difference between the network delay obtained by the first monitoring and the network delay obtained by the last monitoring.

In the step, in consideration of delay due to the network transmission, the network delay between the audio and video source devices is obtained. The network delay monitoring time may be preset, and when said time comes, it will start to monitor the network delay, so as to obtain and record one or more network delay times for one or more recent times of monitoring. The network delay time here may refer to the time when a network delay has been monitored.

The method according to the embodiments of the present disclosure is applicable to a scenario where there are one or more audio playback devices.

For a plurality of different audio playback devices, the network delay of each audio playback device relative to the video source device may be separately monitored.

At 103, a total amount of audio data to be adjusted is determined according to the network delay change.

In the step, the total amount of audio data to be adjusted is determined according to the network delay change. The total amount of audio data to be adjusted is determined according to the time length indicated by the network delay change.

At 104, audio sampling points are added to or deleted from the received audio data according to the total amount of audio data to be adjusted and a preset adjustment strategy, so that the audio playback device is synchronized with the video source device. The added or deleted audio data is then played by the video source device and/or the audio playback device.

In the step, a preset number of audio sampling points are added to or deleted from the received audio data per unit time, until a total amount of adjusting audio sampling points reaches the total amount of audio data to be adjusted.

Synchronization may refer to one between the audio data played by the audio playback device and the audio data played by the video source device, may also refer to one between the audio data played by the audio playback device and the video data played by the video source device, and may also refer to one between the audio data played by the audio playback device and the audio and video data played by the video source device.

The interpolation method may be used to add or delete the preset number of audio sampling points to the received audio data per unit time. In a situation where the network delay becomes long, the spline interpolation is uniformly performed in an adjustment time interval and at least one sampling point is added, in which a total time duration occupied by at least one sampling point is the change range. In a situation where the network delay becomes short, the spline interpolation is uniformly performed in the adjustment time interval and at least one sampling point is deleted, in which a total time duration occupied by at least one sampling point is the change range.

When the sound playback adapts to the delay according to the network state, it will encounter the problem of sound data supplement and deletion. For example, as the network becomes good, if the network delay changes more than 10 ms (e.g., a change from 30 ms to 20 ms), the audio needs to be fast forwarded by 10 ms. If the 10 ms data is directly discarded, it will cause the users to perceive the sounds in an intermittent and discontinuous manner, leading to poor subjective listening experiences. Therefore, it is necessary to gradually complete the advance of 10 ms data in a relatively long adjustment time interval. For example, if the playback time of audio data needs to be accelerated backward by 10 ms, the adjustment time interval is set to 10 s. In this way, it is possible to gradually complete the playback time adjustment within 10 s after the adjustment is determined, reducing the influence on the user's auditory perception. In a case that the audio data playback needs to be advanced after the network delay changes, every 1 s (including 48000 sampling points) within 10 s is advanced by 1 ms (48 sampling points). By discarding 1 ms within 1 s, one sampling point may be discarded from each 1000 sampling points, so that obvious distortion may not be introduced. Alternatively, 48000 sampling points may be interpolated into 47,952 sampling points through interpolation methods (such as cubic spline interpolation). In other words, the audio data playback is advanced by a progressive method without causing the user's perception.

Figure 2:
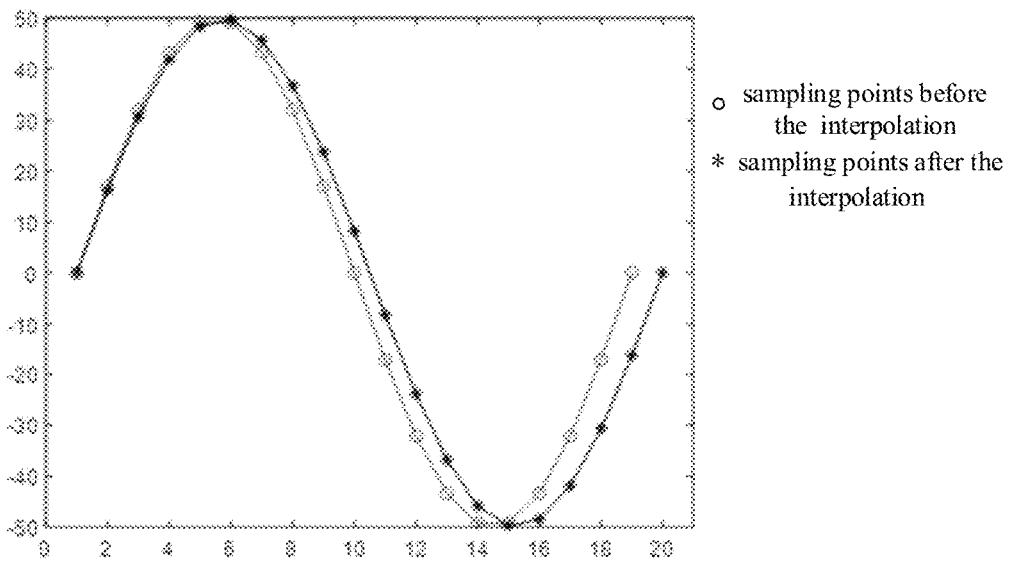
FIG. 2 is a schematic diagram illustrating the principle of increasing sampling points by spline interpolation according to an example embodiment.

As the network deteriorates, if the network delay changes exceed the 10 ms adjustment threshold (e.g., a change from 20 ms to 30 ms), the audio needs to be slowed down for 10 ms, the reverse interpolation may be used to increase the delay by the progressive supplementary data, that is, 47,952 sampling points are interpolated into 48,000 sampling points. FIG. 2 shows an example of interpolating the data from 19 points to 20 points. On the contrary, the 20 sampling points may be interpolated to 19 sampling points.

Figure 3:
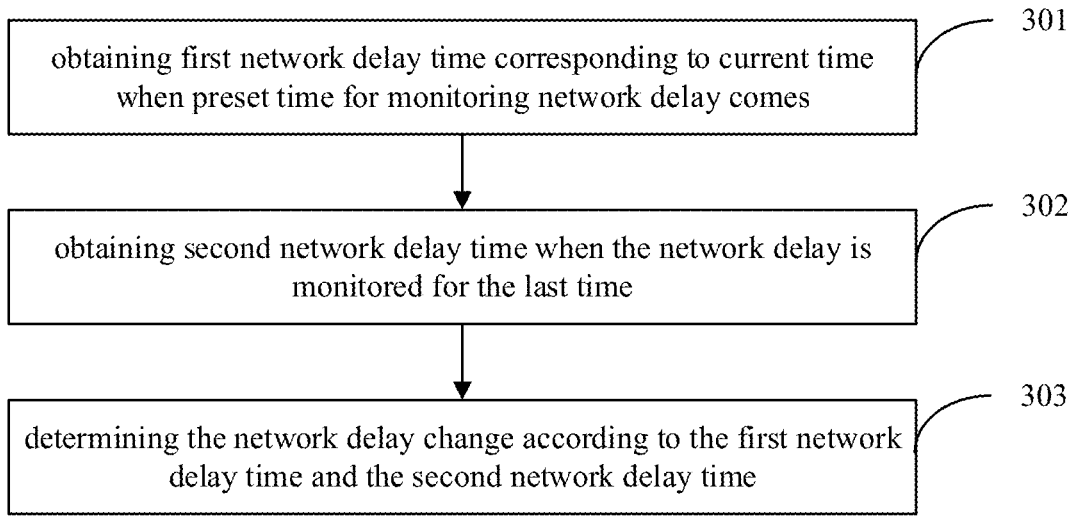
FIG. 3 is a flowchart illustrating another method for audio and video synchronization according to an example embodiment.

An example embodiment of the present disclosure also provides a method for audio and video synchronization. With the method, the network delay change may be determined according to the first network delay time. The specific process is shown in FIG. 3.

At 301, when preset time for monitoring network delay comes, first network delay time corresponding to the current time is obtained.

Figure 4:
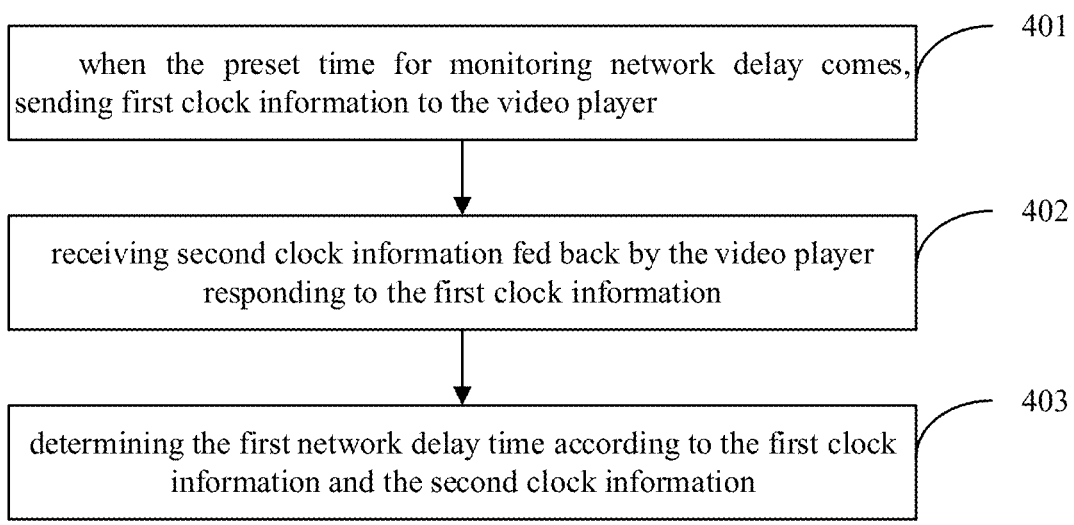
FIG. 4 is a flowchart illustrating yet another method for audio and video synchronization according to an example embodiment.

In the step, the first network delay time may be obtained through clock information interaction between the audio playback device and the video source device. The clock information interaction is carried out in real time, and periodic interaction operations may be carried out at fixed time intervals (for example, 1 s). The details are shown in FIG. 4.

At 401, when preset time for monitoring network delay comes, first clock information is sent to the video source device.

The first clock information includes first sending time. The first sending time is used to indicate the time when the audio playback device sends the first clock information.

At 402, second clock information fed back by the video source device based on the first clock information is received.

In the step, the audio playback device receives the second clock information fed back by the video source device.

The second clock information includes at least first receiving time and second sending time. The first receiving time is used to indicate the time when the video source device receives the first clock information. The second sending time is used to indicate the time when the video source device sends the second clock information.

In another embodiment of the present disclosure, the first sending time may be also carried in the second clock information.

Figure 5:
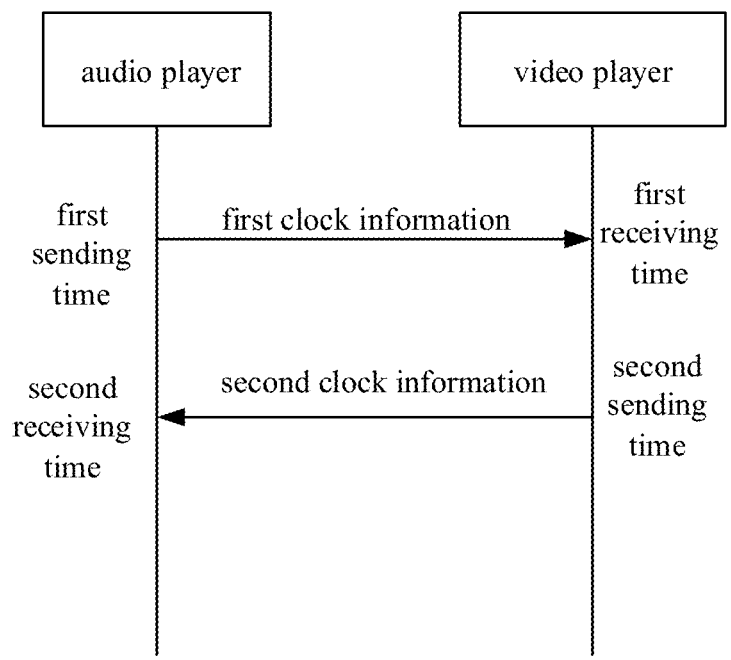
FIG. 5 is a schematic diagram illustrating time stamp information when an audio playback device and a video source device perform clock information interaction according to an example embodiment.

FIG. 5 is a schematic diagram illustrating the principle of the clock information interaction between an audio playback device and a video source device. The audio playback device sends the first clock information at the first sending time and receives the second clock information at the second receiving time. The video source device receives the first clock information at the first receiving time and sends the second clock information at the second sending time.

At 403, the first network delay time is determined according to the first clock information and the second clock information.

The first network delay time may be determined according to the following formula of:

first network delay time=((first receiving time−first sending time)+(second receiving time−second sending time))/2.

At 302, second network delay time is obtained when the network delay is monitored for the last time.

In the step, the second network delay time may be obtained through clock information interaction between the audio playback device and the video source device, since the clock information interaction is performed periodically. In an embodiment, the second network delay time may be determined in a similar way as the first network delay time. The difference between the second and first network delay time lies in, the second one is obtained based on first clock information and second clock information in the last time of monitoring while the first one is obtained based on first clock information and second clock information in the first time of monitoring (at the current time when the preset time comes). For example, the second network delay time may be calculated by the formula of:

second network delay time=((first receiving time−first sending time)+(second receiving time−second sending time))/2.

At 303, a network delay change is obtained according to the first network delay time and the second network delay time.

In the step, the network delay change is obtained based on the results from two times of monitoring the network delay. After determining the network delay change, the playback of the received audio data may be adjusted according to the network delay change.

An example embodiment of the present disclosure also provides a method for audio and video synchronization. The audio data is generally sent by a video source device. The audio data is sent by the video source device in packets. Each packet includes at least one audio frame and division time corresponding to the audio frame. Each audio frame includes a predetermined number of audio sampling points. The division time refers to the time when the action of dividing the audio data into the audio frame occurs. For example, the division time information of each audio frame obtained after the division is packaged together with the audio frame data into an audio packet. In order to reduce network loads, the audio data may also be encoded and compressed before packaging, which accordingly reduces the data amount to be transmitted.

After receiving each audio frame, the audio playback device may determine time for playing the audio frame according to the division time of each audio frame, preset time appointed with the video source device, and the first network delay time. The time for playing the audio frame may be delayed from the appointed time by at least a length of the first network delay time. The audio source device decodes the played video data to obtain image data and audio data. The audio data may be processed and then sent to the audio playback device.

The delayed playback of audio frames may ensure that the effects of network transmission delay time may be eliminated when the audio data is played.

An example embodiment of the present disclosure also provides a method for audio and video synchronization. With the method, system time calibration may be performed between the audio playback device and the video source device, and a system time difference between the audio playback device and the video source device may be determined.

The system time difference may be determined by relying on the clock information interaction process. The system time difference may be calculated according to the following expression:

system time difference=((first receiving time−first sending time)−(second receiving time−second sending time))/2.

In the example in FIG. 5, $T_2-T_1=\Delta+\tau$ $T_4-T_3=-\Delta+\tau$ where τ is the first network delay time when the video source device sends data to the audio playback device, and Δ is the system time difference between the audio playback device and the video source device.

The first network delay time may be set to be greater than or equal to Δ+τ. In order to provide good experiences of audio and video synchronization, the first network delay time is dynamically set by monitoring the network state. The network state may be mapped by τ in the above formula. For example, τ needs to consume 10 ms. Considering the intermediate calculation cost, the playback delay time may be set to Δ+15 ms. It is shown from the actual experiences that less than 200 ms may provide good experiences of audio and video synchronization.

For example, the playback delay time is set to be Δ+1 s, and τ is greater than 1 s. For a T0 moment in a video file, when the video source device and all the audio playback devices are played after 1 s, the video source device plays the images corresponding to an audio and/or the audio at a moment T0+1 s only according to its own system clock, and the audio playback device plays the audio at a moment T0+Δ+1 s in consideration of the system time difference.

Figure 6:
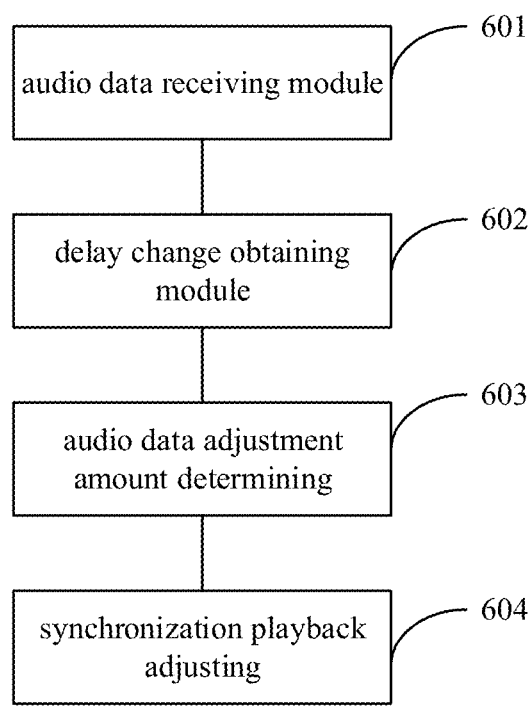
FIG. 6 is a block diagram illustrating an apparatus for audio and video synchronization according to an example embodiment.

An example embodiment of the present disclosure also provides an apparatus for audio and video synchronization. The apparatus illustrated in FIG. 6 includes an audio data receiving module 601, a delay change obtaining module 602, an audio data adjustment amount determining module 603 and a synchronization playback adjusting module 604.

The audio data receiving module 601 is configured to receive audio data sent by the video source device, in which the audio data includes more than one audio sampling points.

The delay change obtaining module 602 is configured to obtain a network delay change between an audio playback device and the video source device. The network delay change refers to a time difference between the network delay obtained by this monitoring and the network delay obtained by the last monitoring. The audio playback device and the video source device are connected via a network.

The audio data adjustment amount determining module 603 is configured to determine a total amount of audio data to be adjusted according to the network delay change.

The synchronization playback adjusting module 604 is configured to add audio sampling points to the received audio data or delete audio sampling points from the received audio data for further playing according to the total amount of audio data to be adjusted and a preset adjustment strategy, so that the audio playback device is synchronized with the video source device.

In an embodiment, the preset adjustment strategy includes: a preset number of audio sampling points are added to or deleted from the received audio data per unit time, until a total amount of adjusting audio sampling points reaches the total amount of audio data to be adjusted.

Figure 7:
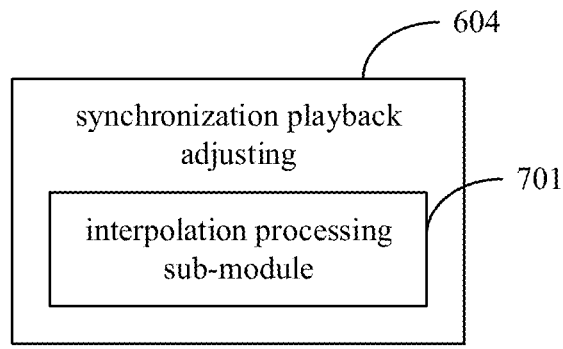
FIG. 7 is a structural schematic diagram illustrating a synchronization play adjusting module 604 according to an example embodiment.

The structure of the synchronization playback adjusting 604 is illustrated in FIG. 7, and includes: an interpolation processing sub-module 701 configured to add the preset number of audio sampling points to the audio data or delete the preset number of audio sampling points from the audio data per unit time in an interpolation method.

Figure 8:
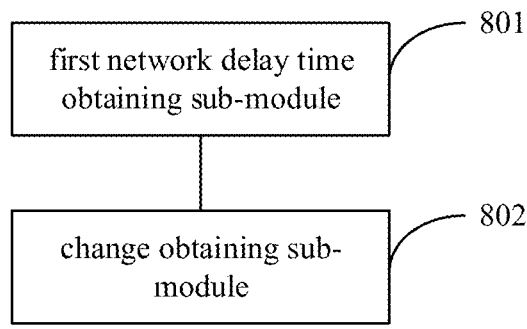
FIG. 8 is a structural schematic diagram illustrating a delay change obtaining module 602 according to an example embodiment.

In an embodiment, the structure of the delay change obtaining module 602 is illustrated in FIG. 8 and includes: a first network delay time obtaining sub-module 801 and a change obtaining sub-module 802.

The first network delay time obtaining sub-module 801 is configured to obtain first network delay time corresponding to the current time when preset time for monitoring network delay comes.

The change obtaining sub-module 802 is configured to obtain the network delay change according to the first network delay time and second network delay time obtained by the last time.

Figure 9:
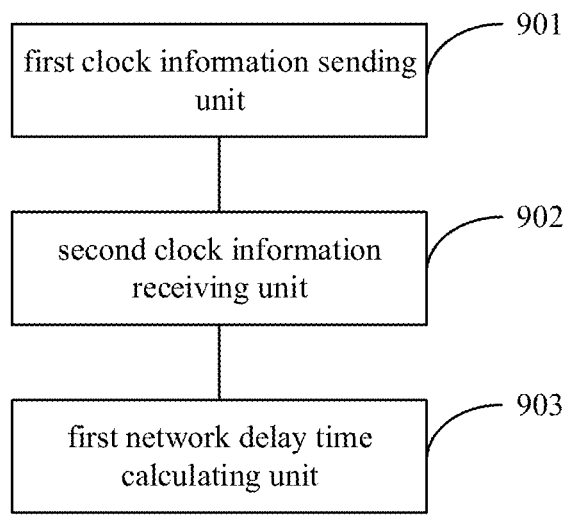
FIG. 9 is a structural schematic diagram illustrating first network delay time obtaining sub-module 801 according to an example embodiment.

In an embodiment, the structure of the first network delay time obtaining sub-module 801 is illustrated in FIG. 9 and includes: a first clock information sending unit 901, a second clock information receiving unit 902, and a first network delay time calculating unit 903.

The first clock information sending unit 901 is configured to: when the preset time for monitoring network delay comes, send first clock information including first sending time to the video source device, in which the first sending time indicates the time when the audio playback device sends the first clock information.

The second clock information receiving unit 902 is configured to receive second clock information fed back by the video source device based on the first clock information. The second clock information includes at least first receiving time for indicating the time when the video source device receives the first clock information, and second sending time for indicating the time when the video source device sends the second clock information.

The first network delay time calculating unit 903 is configured to determine the first network delay time according to the first clock information and the second clock information.

In an embodiment, the first network delay time calculating unit 903 is specifically configured to determine the first network delay time according to the following formula of:

first network delay time=((first receiving time−first sending time)+(second receiving time−second sending time))/2.

In an embodiment, the audio data sent by the video source device is sent in packets. Each packet includes at least one audio frame and division time corresponding to the audio frame. Each audio frame includes a predetermined number of audio sampling points, and the division time refers to the time when the action of dividing the audio data into the audio frame occurs.

Figure 10:
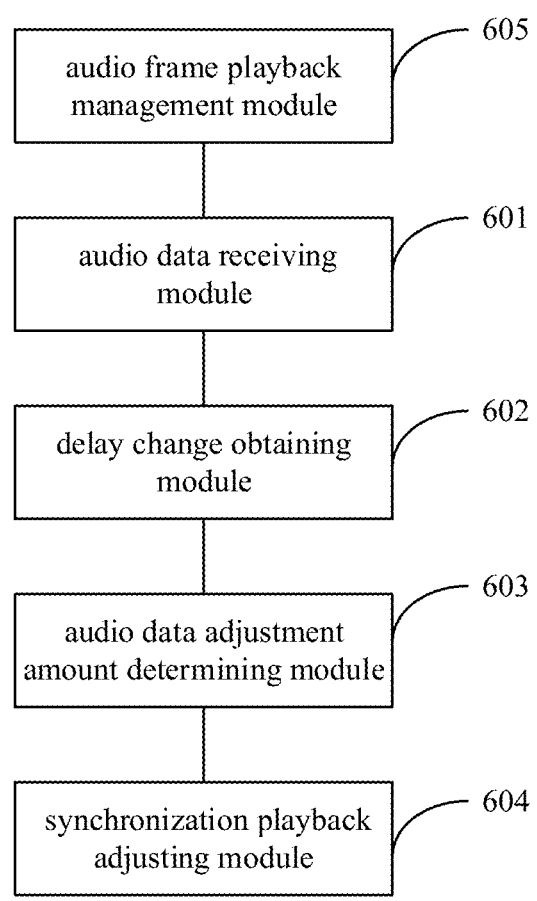
FIG. 10 is a block diagram illustrating an apparatus for audio and video synchronization according to an example embodiment.

The apparatus illustrated in FIG. 10 and also includes: an audio frame playback management module 605, configured to after receiving each audio frame, determine time for playing each audio frame according to the division time of each audio frame, preset time appointed with the video source device, and the first network delay time.

The above-mentioned apparatus may be integrated into an audio playback device, and the corresponding function may be realized by the device. Regarding the apparatus in the foregoing embodiments, the specific manner in which each module performs operation has been described in detail in the method embodiments, which will not be elaborated here.

Figure 11:
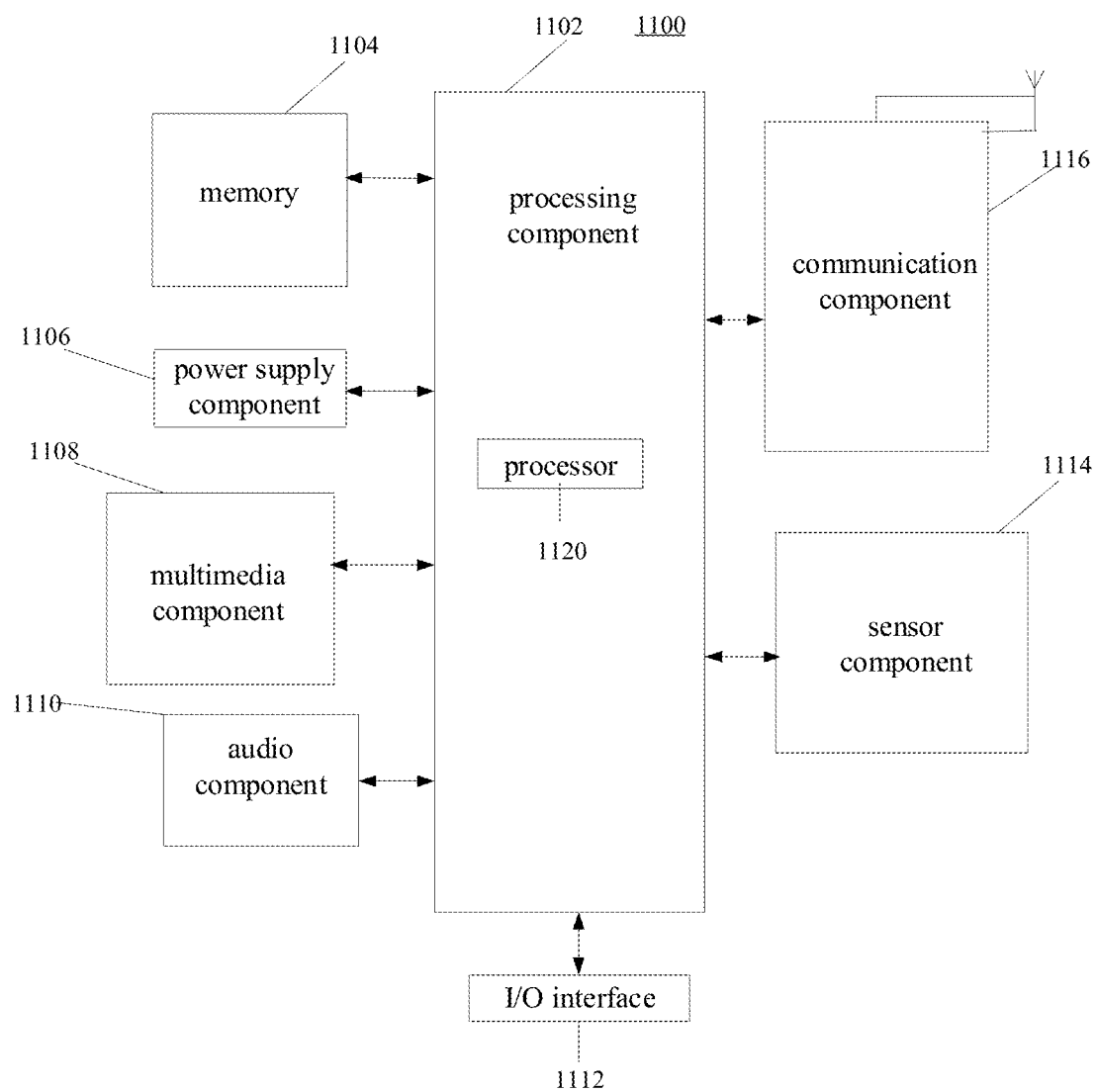
FIG. 11 is a block diagram illustrating a device according to an example embodiment.

FIG. 11 is a block diagram illustrating a device 1100 for playing sounds according to an example embodiment. For example, the device 1100 may be a mobile phone, a computer, a digital broadcasting terminal, a messaging device, a game console, a tablet device, a medical device, a fitness device, a personal digital assistant, etc.

Referring to FIG. 11, the device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 generally controls the whole operations of the device 1100, such as operations associated with displays, telephone calls, data communications, camera operations, and recording operations. The processing component 1102 may include one or more processors 1120 to execute instructions to complete all or part of the steps of the above method. In addition, the processing component 1102 may include one or more modules to facilitate interactions between the processing component 1102 and other components. For example, the processing component 1102 may include a multimedia module to facilitate interactions between the multimedia component 1108 and the processing component 1102.

The memory 1104 is configured to store various types of data to support operations on the device 1100. Examples of such data include instructions for any application or method operating on the device 1100, contact data, phone book data, messages, pictures, videos, etc. The memory 1104 may be implemented by any type of volatile or non-volatile storage device or a combination thereof, such as such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1106 provides power for various components of the device 1100. The power component 1106 may include a power management system, one or more power supplies, and other components associated with generating, managing, and distributing power for the device 1100.

The multimedia component 1108 includes a screen that provides an output interface between the device 1100 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touching, sliding, and gestures on the touch panel. The touch sensor can not only sense the boundary of the touching or sliding action, but also detect the duration and pressure related to the touching or sliding operation. In some embodiments, the multimedia component 1108 includes a front camera and/or a rear camera. When the device 1100 is in an operation mode, such as a shooting mode or a video mode, the front camera and/or the rear camera can receive external multimedia data. Each front camera and rear camera may be a fixed optical lens system or an optical lens system with focal length and optical zoom capacity.

The audio component 1110 is configured to output and/or input audio signals. For example, the audio component 1110 includes a microphone (MIC). When the device 1100 is in an operation mode, such as a call mode, a recording mode, and a speech recognition mode, the microphone is configured to receive an external audio signal. The received audio signals may be further stored in the memory 1104 or transmitted via the communication component 1116. In some embodiments, the audio component 1110 further includes a speaker for outputting audio signals.

The I/O interface 1112 provides an interface between the processing component 1102 and a peripheral interface module. The above-mentioned peripheral interface module may be a keyboard, a click wheel, a button, and the like. These buttons may include, but are not limited to: home button, volume button, start button, and lock button.

The sensor component 1114 includes one or more sensors for providing the device 1100 with various aspects of state evaluation. For example, the sensor component 1114 can detect an on/off state of the device 1100 and the relative positioning of components, such as the display and keypad of the device 1100. The sensor component 1114 can also detect the position change of the device 1100 or a component of the device 1100, a presence or absence of user contact with the device 1100, an orientation or an acceleration/deceleration of the device 1100, and a temperature change of the device 1100. The sensor component 1114 may include a proximity sensor configured to detect the presence of nearby objects when there is no physical contact. The sensor component 1114 may also include a light sensor, such as a CMOS or CCD image sensor, for use in imaging applications. In some embodiments, the sensor component 1114 may also include an acceleration sensor, a gyroscope sensor, a magnetic sensor, a pressure sensor or a temperature sensor.

The communication component 1116 is configured to facilitate wired or wireless communication between the device 1100 and other devices. The device 1100 can access a wireless network based on a communication standard, such as WiFi, 2G, or 3G, or a combination thereof. In an example embodiment, the communication component 1116 receives a broadcast signal or broadcast related information from an external broadcast management system via a broadcast channel. In an example embodiment, the communication component 1116 further includes a near field communication (NFC) module to facilitate short-range communication. For example, the NFC module may be implemented based on a radio frequency identification (RFID) technology, an infrared data association (IRDA) technology, an ultra-wideband (UWB) technology, a Bluetooth (BT) technology and other technologies.

In an example embodiment, the apparatus 1100 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an example embodiment, there is also provided a non-transitory computer-readable storage medium including instructions, such as a memory 1104 including instructions, in which the instructions may be executed by the processor 1120 of the device 1100 to complete the above methods. For example, the non-transitory computer-readable storage medium may be a ROM, a random access memory (RAM), a CD-ROM, a magnetic tape, a floppy disk, an optical data storage device, etc.

A computer device includes a processor and a memory configured to store instructions executable by the processor. The processor is configured to: receive audio data sent by a video source device, in which the audio data includes more than one audio sampling points; obtain a network delay change between an audio playback device and the video source device, in which the network delay change refers to a time difference between the network delay obtained by this monitoring and the network delay obtained by the last monitoring; determine a total amount of audio data to be adjusted according to the network delay change; add audio sampling points to the received audio data or delete audio sampling points from the received audio data for further playing according to the total amount of audio data to be adjusted and a preset adjustment strategy, so that the audio playback device is synchronized with the video source device.

A non-transitory computer-readable storage medium is provided. When instructions in the storage medium are executed by a processor of a mobile terminal, the mobile terminal is caused to execute the method for audio and video synchronization. The method includes: receiving audio data sent by a video source device, in which the audio data includes more than one audio sampling points; obtaining a network delay change between an audio playback device and the video source device, in which the network delay change refers to a time difference between the network delay obtained by this monitoring and the network delay obtained by the last monitoring; determining a total amount of audio data to be adjusted according to the network delay change; and adding audio sampling points to the received audio data or deleting audio sampling points from the received audio data for further playing according to the total amount of audio data to be adjusted and a preset adjustment strategy, so that the audio playback device is synchronized with the video source device.

The embodiments of the present disclosure provide a method and an apparatus for audio and video synchronization. Taking into account the delay due to network transmission, for an audio playback device connected to a video source device through the network, audio data sent by the video source device is first received, in which the audio data includes more than one audio sampling points, a network delay change between the audio playback device and the video source device is then obtained, a total amount of audio data to be adjusted is determined according to the network delay change, and finally, audio sampling points are added to or deleted from the received audio data for further playing according to the total amount of audio data to be adjusted and a preset adjustment strategy, so that the audio playback device is synchronized with the video source device. The problem that the sounds are out of sync with the pictures caused by the network transmission delay is solved, which accordingly improves user experiences.

For users who have a TV and two or more smart speakers in the family, the TV is connected to the smart speakers, and the sound content in the video may be played by the TV together with speakers, which accordingly achieves surround sounds and better listening and viewing experiences than the TV alone.

The network state is monitored based on the clock information interaction, and the delay of sound playback is dynamically adjusted according to the results of monitoring the network state, which accordingly provides a more natural experience for audio and video synchronization.

When the audio data is adjusted to play forward or backward, the spline interpolation method is used to supplement or delete the data change caused by dynamic adjustments, which accordingly reduces a perceptible degree of data changes and further optimizing user experiences.

The technical solutions according to the embodiments of the present disclosure may include the following beneficial effects: taking into account the delay due to network transmission, for an audio playback device connected to a video source device through the network, audio data sent by the video source device is first received, in which the audio data includes more than one audio sampling points, a network delay change between the audio playback device and the video source device is then obtained, a total amount of audio data to be adjusted is determined according to the network delay change, and finally, audio sampling points are added to or deleted from the received audio data for further playing according to the total amount of audio data to be adjusted and a preset adjustment strategy, so that the audio playback device is synchronized with the video source device. The problem that the sounds are out of sync with the pictures caused by the network transmission delay is solved, which accordingly improves user experiences.

After considering the specification and practicing the disclosure herein, those skilled in the art will easily think of other implementations. The present disclosure is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope.

What is claimed is:

1. A method for audio and video synchronization, applied to an audio player connected to a video player via a network, the method comprising:
   receiving audio data sent by the video player, wherein the audio data comprises more than one audio sampling points;
   obtaining a network delay change between the audio player and the video player, wherein the network delay change refers to a time difference between network delay monitored for the first time and network delay monitored for the last time;
   determining a total amount of audio data to be adjusted according to the network delay change; and
   adding audio sampling points to the received audio data or deleting audio sampling points from the received audio data according to the total amount of audio data to be adjusted and a preset adjustment strategy, so that the audio player is synchronized with the video player, and playing the added or deleted audio data.

2. The method of claim 1, wherein the preset adjustment strategy comprises: a preset number of audio sampling points are added to or deleted from the received audio data per unit time, until a total amount of adjusting audio sampling points reaches the total amount of audio data to be adjusted.

3. The method of claim 2, wherein the preset number of audio sampling points are added to or deleted from the received audio data per unit time in an interpolation method.

4. The method of claim 1, wherein obtaining the network delay change between the audio player and the video player comprises:
   obtaining first network delay time corresponding to the current time when preset time for monitoring network delay comes;

obtaining second network delay time when the network delay is monitored for the last time; and determining the network delay change according to the first network delay time and the second network delay time.

5. The method of claim 4, wherein obtaining first network delay time corresponding to the current time when preset time for monitoring network delay comes comprises:

sending first clock information comprising first sending time to the video player when the preset time for monitoring network delay comes, wherein the first sending time indicates the time when the audio player sends the first clock information;

receiving second clock information fed back by the video player responding to the first clock information, wherein the second clock information comprises at least first receiving time for indicating the time when the video player receives the first clock information, and second sending time for indicating the time when the video player sends the second clock information; and determining the first network delay time according to the first clock information and the second clock information.

6. The method of claim 5, wherein determining the first network delay time comprises:

determining the first network delay time according to the formula of:

first network delay time=((first receiving time−first sending time)+(second receiving time−second sending time))/2.

7. The method of claim 1, wherein the received audio data is sent by the video player in packets, wherein each packet comprises at least one audio frame and division time corresponding to the at least one audio frame, each audio frame comprises a predetermined number of audio sampling points, and the division time of each audio frame refers to the time when the action of dividing the received audio data into the audio frame occurs.

8. The method of claim 7, further comprising:

determining time for playing each audio frame according to the division time of each audio frame, preset time appointed with the video player, and the first network delay time.

9. A computer device, comprising
a processor; and
a memory configured to store instructions executable by the processor;
wherein the processor is configured to:
receive audio data sent by a video player, wherein the audio data comprises more than one audio sampling points;
obtain a network delay change between an audio player and the video player, wherein the network delay change refers to a time difference between network delay monitored for the first time and network delay monitored for the last time, and the audio player and the video player are connected via a network;
determine a total amount of audio data to be adjusted according to the network delay change; and
add audio sampling points to the received audio data or delete audio sampling points from the received audio data according to the total amount of audio data to be adjusted and a preset adjustment strategy, so that the audio player is synchronized with the video player, and play the added or deleted audio data.

10. The device of claim 9, wherein the preset adjustment strategy comprises: a preset number of audio sampling points are added to or deleted from the received audio data per unit time, until a total amount of adjusting audio sampling points reaches the total amount of audio data to be adjusted.

11. The device of claim 10, wherein the processor is further configured to:

add the preset number of audio sampling points to the received audio data or delete the preset number of audio sampling points from the received audio data per unit time in an interpolation method.

12. The device of claim 9, wherein the processor is further configured to:

obtain first network delay time corresponding to the current time when preset time for monitoring network delay comes;

obtain second network delay time when the network delay is monitored for the last time; and determine the network delay change according to the first network delay time and the second network delay time.

13. The device of claim 12, wherein the processor is further configured to:

when the preset time for monitoring network delay comes, send first clock information comprising first sending time to the video player, wherein the first sending time indicates the time when the audio player sends the first clock information;

receive second clock information fed back by the video player responding to the first clock information, wherein the second clock information comprises at least first receiving time for indicating the time when the video player receives the first clock information, and second sending time for indicating the time when the video player sends the second clock information; and determine the first network delay time according to the first clock information and the second clock information.

14. The device of claim 13, wherein the processor is further configured to determine the first network delay time according to the formula of:

first network delay time=((first receiving time−first sending time)+(second receiving time−second sending time))/2.

15. The device of claim 9, wherein the received audio data is sent by the video player in packets, wherein each packet comprises at least one audio frame and division time corresponding to the at least one audio frame, each audio frame comprises a predetermined number of audio sampling points, and the division time of each audio frame refers to the time when the action of dividing the received audio data into the audio frame occurs.

16. The device of method claim 15, wherein the processor is configured to determine time for playing each audio frame according to the division time of each audio frame, preset time appointed with the video player, and the first network delay time.

17. A non-transitory computer-readable storage medium, when instructions in the storage medium are executed by a processor of a mobile terminal, the mobile terminal is caused to execute the method for audio and video synchronization, the method comprising:

receiving audio data sent by a video player, wherein the audio data comprises more than one audio sampling points;

obtaining a network delay change between an audio player and the video player, wherein the network delay change refers to a time difference between the network delay monitored for the first time and the network delay monitored for the last time;

determining a total amount of audio data to be adjusted according to the network delay change; and adding audio sampling points to the received audio data or deleting audio sampling points from the received audio data according to the total amount of audio data to be adjusted and a preset adjustment strategy, so that the audio player is synchronized with the video player, and playing the added or deleted audio data.

18. The storage medium of claim 17, wherein the preset adjustment strategy comprises: a preset number of audio sampling points are added to or deleted from the received audio data per unit time, until a total amount of adjusting audio sampling points reaches the total amount of audio data to be adjusted.

19. The storage medium of claim 18, wherein the preset number of audio sampling points are added to or deleted from the received audio data per unit time in an interpolation method.

20. The storage medium of claim 17, wherein obtaining the network delay change between the audio player and the video player comprises:

obtaining first network delay time corresponding to the current time when preset time for monitoring network delay comes;

obtaining second network delay time when the network delay is monitored for the last time; and determining the network delay change according to the first network delay time and the second network delay time.

* * * * *